(12) United States Patent
Sayed et al.

(10) Patent No.: US 6,207,072 B1
(45) Date of Patent: *Mar. 27, 2001

(54) COOLING MEDIUM FOR USE AT ELEVATED TEMPERATURES

(75) Inventors: Aziz El Sayed, Leverkusen; Detlev Joachimi, Krefeld; Hartwig Meier, Odenthal; Karsten-Josef Idel, Krefeld, all of (DE)

(73) Assignee: Bayer AG, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,240

(22) PCT Filed: Sep. 30, 1996

(86) PCT No.: PCT/EP96/04256

§ 371 Date: Apr. 3, 1998

§ 102(e) Date: Apr. 3, 1998

(87) PCT Pub. No.: WO97/14761

PCT Pub. Date: Apr. 24, 1997

(30) Foreign Application Priority Data

Oct. 13, 1995 (DE) .............................. 195 38 246

(51) Int. Cl.⁷ ...................................... C09K 5/00
(52) U.S. Cl. .............................. 252/73; 252/70
(58) Field of Search ......................... 252/73, 70

(56) References Cited

U.S. PATENT DOCUMENTS

| 4,320,025 | * | 3/1982 | Diebel ................... 252/78.5 |
| 4,873,011 | | 10/1989 | Jung et al. .............. 252/75 |
| 5,064,552 | | 11/1991 | Oppenlaender et al. . |
| 5,073,283 | * | 12/1991 | Goddard et al. ....... 252/78.5 |
| 5,213,669 | * | 5/1993 | Guttman .............. 204/180.1 |

FOREIGN PATENT DOCUMENTS

| 242 900 | | 10/1987 | (EP) . |
| 361 252 | | 4/1990 | (EP) . |
| 398 284 | | 11/1990 | (EP) . |
| 131751 | * | 12/1985 | (PL) . |
| 157616 | * | 6/1992 | (PL) . |
| 161390 | * | 6/1993 | (PL) . |

OTHER PUBLICATIONS

Chemical Abstracts 82:35387, Chudnov et al, "Effect of the Additions of Polyethylene Glycols on the Freezing Temperature of Di–and Triethylene Glycols", 1974 No Month Available.*

* cited by examiner

Primary Examiner—Yogendra Gupta
Assistant Examiner—Derrick G. Hamlin
(74) Attorney, Agent, or Firm—Connolly, Bove, Lodge & Hutz LLP

(57) ABSTRACT

A coolant containing 35–65 wt. % polyethylene glycol and 65–35 wt. % ethylene glycol, which is especially useful for cooling motor vehicle engines.

10 Claims, No Drawings

COOLING MEDIUM FOR USE AT ELEVATED TEMPERATURES

BACKGROUND OF THE INVENTION

1. Field of the Invention

The present invention relates to cooling mediums at elevated temperatures, such as 130° C.

2. Description of the Prior Art

Heat-stabilized, glass-fibre-reinforced polyamide (PA) 66 is successfully used throughout the world in motor vehicle coolant systems. The economical and efficient manufacture of cooling water tanks, water pipes and thermostatic valve housings in addition to high dynamic loading capacity and resistance to the cooling medium at 108° C. predestines PA 66 for this field of application. Development work to increase the efficiency of internal combustion engines expects higher temperature stresses in the cooling medium. Demands on mechanical properties following contact with the cooling medium at 130° C. are increasing.

A mixture comprising ethylene glycol:water in the ratio 1:1 is described as cooling medium in the motor vehicle field. The mixture solidifies at −30° C. and boils at 108° C. Azeotropic distillation is not involved. First of all, the water distils off at 108° C. The temperature of the boiling material increases as the ethylene glycol content increases, until pure glycol distils at 197.4° C.

If the temperature of the cooling medium in the closed cooling system rises to 130° C., the internal pressure rises to 2 bars. With the increase in the operating temperature of the cooling medium, in addition to very good tightness, high mechanical strength values at 130° C. in the state saturated with cooling medium are a prerequisite for the operation of the cooling system. If part of the cooling medium escapes as steam, the ethylene glycol content in the cooling medium increases. Components made of polyamide may partially dissolve if glycol content and temperature increase perceptibly.

The object of the invention was therefore to develop a cooling medium which operates at the desired temperatures (approx. 130° C.) without pressure increase and does not perceptibly impair the mechanical properties of polyamide.

The invention provides a cooling medium containing

A) 35–65, preferably 45 to 55 wt. % of polyethylene glycol

B) 35–65, preferably 45 to 55 wt. % of ethylene glycol.

The cooling medium is suitable for cooling motor vehicle engines.

DESCRIPTION OF THE PREFERRED EMBODIMENTS

Polyethylene glycols of the formula HO—(CH$_2$—CH$_2$—O)$_n$—H, with an average molar mass between 285 and 420 g/mol, a hydrolysis value between 271–315 and a density between 1.12–1.15 g/cm$^3$ are suitable as polyethylene glycol (A) of the mixture according to the invention.

Technical ethylene glycols of the formula HO—CH$_2$—CH$_2$—OH, a molar weight of 60.05 g/mol and a density of 1.10 to 1.13 g/cm$^3$ are suitable as ethylene glycol (B) of the mixture according to the invention.

Stabilizers may additionally be added to the mixture.

Metal deactivators, phosphites and anti-oxidants, such as are conventionally used in the stabilization of a cooling medium, are suitable as stabilizer. The stabilizer is conventionally added in quantities up to 2 wt. %, related to 100 wt. % of mixture comprising A) and B).

It has surprisingly been found that glass-fibre-reinforced PA 6 is also resistant to this cooling medium at 130° C. PA 6 can therefore also be used for the manufacture of components in the cooling system, such as cooling water tanks, thermostatic valve housings, cooling water pipes.

The glass fibre content is generally 25–45 wt. %, preferably 30–35 wt. % (related to the total moulding compound).

EXAMPLES

The following products are used in the examples:

PA 66 GF 30=Durethane AKV 30 HR H 2.0 9005/0, Bayer AG

PA 6 GF 30=Durethane BKV 30 H 2.0 9005/0, Bayer AG Pseudoplastic

PA 6 GF 30=Durethane KU 2-2140/30 H 2.0 9005/0, Bayer AG

Polyglycol 300=Polyethylene glycol 300, e.g. Hoechst or Merck

Polyglycol 400=Polyethylene glycol 400, e.g. Hoechst or Merck

Ethylene glycol=Ethanediol

Example 1 (Comparison)

Test bodies made of Durethane AKV 30 HR H 2.0 9005/0 (Bayer AG) are stored in a cooling medium, consisting of ethanediol:water in the weight ratio 1:1, in an autoclave.

The autoclave is half-filled with cooling medium (ethanediol:water in the ratio 1:1) as tempering fluid. The test bodies are stored separately in the cooling medium in special steel containers. At 130° C. the pressure gauge gives a pressure reading of 2 bars. The heating is switched off after 10, 21 and 40 days. After a cooling time of 16 hours, the test bodies are removed, washed with water, dried, weighed and tested within three hours. The results obtained are summarized in Table 1.

Example 2

Test bodies made of Durethane AKV 30 HR H 2.0 9005/0 (Bayer AG) are stored in a flask with reflux condenser, in a cooling medium consisting of ethanediol:polyglycol 300 (1:1). The flask is heated by means of an oil bath at 137° C. The temperature of the cooling medium is constantly kept at 130° C. The test bodies are removed after 10, 21 and 40 days, cooled in cold cooling medium, washed with water, dried, weighed and tested within three hours. The results obtained are summarized in Table 1.

Example 3

The tests in Example 2 are repeated. The storage tests take place at a cooling medium temperature of 150° C. The results obtained are summarized in Table 1.

Examples 4 and 5

Example 1 is repeated with test bodies made of Durethane KU 2-2140/30 instead of AKV 30 HR at 130 and 120° C. The results obtained are summarized in Table 2.

Example 6

Example 2 is repeated with test bodies made of Durethane KU 2-2140/30 H 2.0 and BKV 30 H 2.0 9005/0 instead of AKV 30 HR at 130° C. The results obtained are summarized in Table 2.

TABLE 1

Mechanical properties of AKV 30 HR H 2.0 9005/0 after storage in various cooling media at 130° C. and 150° C.

| | | | Example No. | | |
|---|---|---|---|---|---|
| | | | 1 (comparison) | 2 | 3 |
| Cooling medium | | Days (d) | Glycol:water (1:1) | Polyglycol: glycol (1:1) | Polyglycol: glycol (1:1) |
| Temp./ pressure | ° C./ bars | | 130/2 | 130/1 | 150/1 |
| Weight increase | % | 0 d | 11 | 8 | 9 |
| | | 21 d | 11 | 8 | 9 |
| | | 42 d | 11 | 8 | 9 |
| Impact strength ISO 180 1C | kJ/m² | 0 d | 61 | 61 | 61 |
| | | 10 d | 57 | 100 | 88 |
| | | 21 d | 54 | 83 | 59 |
| | | 42 d | 17 | 61 | 25 |
| Tear strength ISO 527 | MPa | 0 d | 181 | 181 | 181 |
| | | 10 d | 75 | 104 | 99 |
| | | 21 d | 66 | 101 | 95 |
| | | 42 d | 32 | 98 | 54 |
| Elongation at tear ISO 527 | % | 0 d | 3.9 | 3.9 | 3.9 |
| | | 10 d | 4.8 | 7.3 | 6.0 |
| | | 21 d | 3.2 | 5.4 | 5.0 |
| | | 42 d | 1.1 | 4.2 | 1.8 |
| Tensile E modulus DIN 53457-1 | MPa | 0 d | 9330 | 9330 | 9330 |
| | | 10 d | 3790 | 4490 | 4500 |
| | | 21 d | 3870 | 4500 | 4500 |
| | | 42 d | 3670 | 4780 | 4270 |
| Bending strength ISO 178 | MPa | 0 d | 281 | 281 | 281 |
| | | 10 d | 107 | 145 | 139 |
| | | 21 d | 84 | 147 | 109 |
| | | 42 d | 36 | 136 | 58 |
| Outer fibre strain ISO 178 | % | 0 d | 4.8 | 4.8 | 4.8 |
| | | 10 d | 5.7 | 7.6 | 7.3 |
| | | 21 d | 3.7 | 7.4 | 4.5 |
| | | 42 d | 1.5 | 5.7 | 2.6 |
| Bending E modulus ISO 178 | MPa | 0 d | 8590 | 8590 | 8590 |
| | | 10 d | 3300 | 3980 | 3810 |
| | | 21 d | 3340 | 4000 | 3750 |
| | | 42 d | 3110 | 4120 | 3310 |

TABLE 2

Mechanical properties of BKV 30 H 2.0 9005/0 and KU 2-2140/30 H 2.0 9005/0 after storage in various cooling media at 120° C. and 130° C.

| | | | Example | | | |
|---|---|---|---|---|---|---|
| | | | 4 | 5 | 6 | 7 |
| Polyamide | | | KU-2 2140/30 | KU 2-2140/30 | KU 2-2140/30 | BKV 30 |
| Cooling medium | | Days (d) | Glycol: water (1:1) | Glycol: water (1:1) | Polyglycol: glycol (1:1) | Polyglycol: glycol (1:1) |
| Temp./ pressure | ° C./ bars | | 120/1.6 | 130/2 | 130/1 | 130/1 |
| Weight increase | % | 10 d | 12 | 11 | 10 | 10 |
| | | 21 d | 11 | 11 | 10 | 10 |
| | | 42 d | 12 | 11 | 10 | 10 |
| Impact strength ISO 180 IC | kJ/m² | 0 d | 67 | 67 | 67 | 65 |
| | | 10 d | 67 | 35 | 80 | 84 |
| | | 21 d | 51 | 13 | 67 | 69 |
| | | 42 d | 19 | — | 49 | 50 |
| Tear strength ISO 527 | MPa | 0 d | 176 | 176 | 176 | 170 |
| | | 10 d | 69 | 52 | 86 | 87 |
| | | 21 d | 66 | 26 | 87 | 84 |
| | | 42 d | 33 | — | 83 | 80 |
| Elongation at tear ISO 527 | % | 0 d | 3 | 3 | 3 | 3.3 |
| | | 10 d | 5.6 | 3.1 | 6.2 | 7.2 |
| | | 21 d | 4.6 | 0.9 | 5.8 | 6.1 |
| | | 42 d | 1.2 | — | 4.7 | 4.2 |
| Tensile E modulus DIN 53457-1 | MPa | 0 d | 10710 | 10710 | 10710 | 9580 |
| | | 10 d | 3670 | 3830 | 4190 | 4000 |
| | | 21 d | 3920 | 3670 | 4340 | 4140 |
| | | 42 d | 3790 | — | 4430 | 4190 |
| Bending strength ISO 178 | MPa | 0 d | 262 | 262 | 262 | 260 |
| | | 10 d | 97 | 72 | 118 | 123 |
| | | 21 d | 93 | 35 | 115 | 120 |
| | | 42 d | 40 | — | 90 | 95 |
| Outer fibre strain ISO 178 | % | 0 d | 4.1 | 4.1 | 4.1 | 4 |
| | | 10 d | 6.8 | 4 | 7.5 | 7.3 |
| | | 21 d | 5.6 | 1.4 | 6.5 | 6.3 |
| | | 42 d | 1.7 | — | 4.2 | 4.7 |
| Bending E modulus ISO 178 | MPa | 0 d | 8610 | 8610 | 8610 | 8410 |
| | | 10 d | 3180 | 3170 | 3530 | 3630 |
| | | 21 d | 3400 | 3125 | 390 | 3670 |
| | | 42 d | 3220 | — | 3660 | 3670 |

From Example 1 (comparative test) in Table 1 it can be seen that:
1) the internal pressure in the cooling system rises to 2 bars;
2) impact strength, tear strength and bending strength decrease steadily with the storage period;
3) the modulus values drop in the course of saturation with cooling medium and remain at the level reached;
4) the elongation values rise only through saturation with cooling medium and then drop as a result of surface decomposition.

Examples 2 and 3 show that:
1) the weight increase on storage in the cooling medium claimed is lower than in the comparative test (Example 1) at both 130° C. and 150° C.;
2) there is no pressure increase at temperatures up to 150° C.;
3) the properties after storage at 130° C. are distinctly higher than in the comparative test and still perceptibly higher at 150° C.

From Table 2 it can be seen that:
1) when stored in the standard cooling medium Durethane KU 2-2140/30/pseudoplastic PA 6 GF 30 can only be used up to 120° C. (pressure rise to 1.6 bars);
2) for both Durethane KU 2-2140/30 and the standard PA 6 GF 30 (Durethane BKV 30), the properties after storage at 130° C. in the cooling medium claimed are at a distinctly higher level than in the comparative test (Example 1 in Table 1).

What is claimed is:
1. A cooling medium consisting essentially of:
   A) 35–65 wt. % of a polyethylene glycol having an average molar mass of between 285 and 420 g/mol,
   B) 35–65 wt. % of ethylene glycol, and
   C) optionally, at least one stabilizer.
2. The cooling medium according to claim 1, wherein the polyethylene glycol has the formula HO—(CH$_2$—CH$_2$—O)$_n$—H, a hydrolysis value of between 271 and 315, and a density of between 1.12 and 1.15 g/cm³.
3. The cooling medium according to claim 1, wherein the at least one stabilizer consists essentially of a metal deactivator, a phosphite, am anti-oxidant, or a mixture thereof.

4. The cooling medium according to claim 3, wherein the at least one stabilizer is present in an amount of up to 2 wt. %, based on the total weight of components (A) and (B).

5. The cooling medium according to claim 1, where component (A) and component (B) are present in about a 1:1 ratio.

6. The cooling medium according to claim 1, wherein component (A) contains 45 to 55 wt. % of the polyethylene glycol.

7. The cooling medium according to claim 6, wherein component (B) contains 45 to 55 wt. % of the ethylene glycol.

8. The cooling medium according to claim 1, wherein component (B) contains 45 to 55 wt. % of the ethylene glycol.

9. The cooling medium according to claim 1, which is essentially free of water.

10. A cooling medium consisting of:
A) 35–65 wt. % of a polyethylene glycol having an average molar mass of between 285 and 420 g/mol,
B) 35–65 wt. % of ethylene glycol, and
C) optionally, at least one stabilizer.

* * * * *